US010432972B2

(12) United States Patent
Mukherjee et al.

(10) Patent No.: US 10,432,972 B2
(45) Date of Patent: Oct. 1, 2019

(54) GUIDED OFFSET CORRECTION FOR LOOP RESTORATION IN VIDEO CODING

(71) Applicant: GOOGLE LLC, Mountain View, CA (US)

(72) Inventors: Debargha Mukherjee, Cupertino, CA (US); Yue Chen, Sunnyvale, CA (US); Aamir Anis, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 168 days.

(21) Appl. No.: 15/297,603

(22) Filed: Oct. 19, 2016

(65) Prior Publication Data

US 2018/0109811 A1    Apr. 19, 2018

(51) Int. Cl.
*H04N 19/65* (2014.01)
*H04N 19/184* (2014.01)
(Continued)

(52) U.S. Cl.
CPC .......... *H04N 19/65* (2014.11); *H04N 19/117* (2014.11); *H04N 19/136* (2014.11); *H04N 19/154* (2014.11); *H04N 19/172* (2014.11); *H04N 19/174* (2014.11); *H04N 19/176* (2014.11); *H04N 19/182* (2014.11); *H04N 19/184* (2014.11); *H04N 19/46* (2014.11); *H04N 19/82* (2014.11)

(58) Field of Classification Search
CPC .... H04N 19/65; H04N 19/136; H04N 19/154; H04N 19/117; H04N 19/46; H04N 19/174; H04N 19/82; H04N 19/176; H04N 19/182; H04N 19/172; H04N 19/184
See application file for complete search history.

(56) References Cited

U.S. PATENT DOCUMENTS

2003/0026335 A1\* 2/2003 Thyagarajan .......... G06T 9/007
375/240.2
2013/0051454 A1    2/2013 Sze et al.
(Continued)

OTHER PUBLICATIONS

Fu, Chih-Ming, "Sample Adaptive Offset in the HEVC Standard"; IEEE Transactions on Circuits and Systems for Video Technology, vol. 22, No. 12, Dec. 2012; pp. 1755-1764.
(Continued)

*Primary Examiner* — Tat C Chio
(74) *Attorney, Agent, or Firm* — Young Basile Hanlon & MacFarlane, P.C.

(57) ABSTRACT

Reducing error in a reconstructed frame is described. Pixels of the frame are classified into classes based on a classification scheme. Offset values for each class of at least some of the classes are determined, and a respective offset value for a class is applied to each pixel of the class, resulting in offset-adjusted pixels for the class. For the classes, a respective error rate reduction in using the respective offset value for a class as compared to omitting the respective offset value is determined, where the respective error rate reduction is based on the pixels of the class in the reconstructed frame, the offset-adjusted pixels of the class, and co-located source pixels in a source frame decoded to generate the reconstructed frame. A subset of classes is selected for reducing error in the reconstructed frame based on the error rate reductions.

19 Claims, 8 Drawing Sheets

(51) Int. Cl.
*H04N 19/172* (2014.01)
*H04N 19/182* (2014.01)
*H04N 19/176* (2014.01)
*H04N 19/46* (2014.01)
*H04N 19/117* (2014.01)
*H04N 19/154* (2014.01)
*H04N 19/174* (2014.01)
*H04N 19/82* (2014.01)
*H04N 19/136* (2014.01)

(56) References Cited

U.S. PATENT DOCUMENTS

2013/0177068 A1* 7/2013 Minoo ............... H04N 19/117
  375/240.02
2014/0301480 A1* 10/2014 Francois ............ H04N 19/85
  375/240.25
2015/0124866 A1* 5/2015 Fu ..................... H04N 19/82
  375/240.02

OTHER PUBLICATIONS

Kaup, Andre, "Image restoration for frame- and object-based video coding using an adaptive constrained least-squares approach"; Signal Processing 80 (2000) 2337}2345; Siemens Corporate Technology, Networks and Multimedia Communications, ZT IK2, 81730 Munich, Germany.

Bankoski, et al., "Technical Overview of VP8, An Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

Laroche et al.; "On additional SAO Band Offset classifications"; Nov. 8, 2011; sections 1 and 2.

International Search Report and Written Opinion for International Patent Application No. PCT/US2017/044648; dated Oct. 24, 2017.

* cited by examiner

GUIDED OFFSET CORRECTION FOR LOOP RESTORATION IN VIDEO CODING

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

Encoding using compression may be performed by breaking frames or images into blocks. A decoder may apply one or more filters to a reconstructed frame in order to remove or smooth out artifacts caused by this lossy encoding.

SUMMARY

The disclosure relates in general to video coding, and in particular to loop restoration using guided offset correction. Reduction in error in a reconstructed frame can result.

One aspect of the disclosed implementations is a method including classifying the pixels of a reconstructed frame into classes based on a classification scheme, at least some of the classes including a subset of the pixels, determining a respective offset value for each class of at least some of the classes, applying the respective offset value for a class to each pixel of the class resulting in respective offset-adjusted pixels for the class, and determining, for each class of the at least some of the classes, a respective error rate reduction in using the respective offset value for the class as compared to omitting the respective offset value. The respective error rate reduction is based on the pixels of the class in the reconstructed frame, the offset-adjusted pixels of the class, and co-located source pixels in a source frame decoded to generate the reconstructed frame. The method also includes selecting, for reducing error in the reconstructed frame, a subset of the at least some of the classes based on the error rate reductions.

Another aspect of the disclosed implementations is an apparatus including a non-transitory memory and a processor. The processor is configured to execute instructions stored in the memory to classify the pixels of a reconstructed frame into classes based on a classification scheme, at least some of the classes including a subset of the pixels, determine a respective offset value for each class of at least some of the classes, apply the respective offset value for a class to each pixel of the class resulting in respective offset-adjusted pixels for the class, determine, for each class of the at least some of the classes, a respective error rate reduction in using the respective offset value for the class as compared to omitting the respective offset value, and select, for reducing error in the reconstructed frame, a subset of the at least some of the classes having highest values for the error rate reductions. Values for the error rate reduction are based on the pixels of the class in the reconstructed frame, the offset-adjusted pixels of the class, and co-located source pixels in a source frame decoded to generate the reconstructed frame.

Another aspect of the disclosed implementations is a method that includes decoding classification parameters of a classification scheme and offset values for a reconstructed frame, from an encoded bitstream, the classification parameters and the offset values encoded by classifying pixels of a reconstructed frame generated by an encoder decoding a source frame into classes based on the classification scheme, at least some of the classes including a subset of the pixels, determining a respective offset value for each class of at least some of the classes, applying the respective offset value for a class to each pixel of the class resulting in respective offset-adjusted pixels for the class, determining, for each class of the at least some of the classes, a respective error rate reduction in using the respective offset value for the class as compared to omitting the respective offset value, the respective error rate reduction based on the pixels of the class in the reconstructed frame generated by the encoder, the offset-adjusted pixels of the class, and co-located source pixels in the source frame, selecting, for encoding the source frame, a subset of the at least some of the classes based on the error rate reductions, and encoding, in associated with the source frame, the classification parameters and the offset values for at least classes of the subset. The method also includes classifying the pixels into classes based on the classification parameters, and applying a respective offset value for a class to each pixel of the class within the reconstructed frame to generate an offset-adjusted frame.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

DETAILED DESCRIPTION

As mentioned above, compression schemes related to coding video streams may include breaking images into blocks and generating a digital video output bitstream using one or more techniques to limit the information included in the output. A received bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously-coded pixel values and those in the current block. In this way, only the residual and parameters used to generate it need be added to the bitstream instead of including the entirety of the current block. The residual may be encoded using a lossy quantization step. Decoding (i.e., reconstructing) an encoded block from such a residual results in a distortion between the original and the reconstructed block.

Post-reconstruction loop filters may be used in various ways to improve reconstructed frames distorted or degraded as a result of the encoding and decoding processes. For example, in-loop deblocking filters can be used to modify pixel values near borders between blocks to limit the visibility of those borders within the reconstructed frame. Other loop filters may be used to bring the images closer to the source images by, for example, adding offsets that are determined at the encoder to pixel values of the reconstructed frame. Those loop filters may operate in a blind setting (i.e., without access to both a source frame and its associated reconstructed frame). According to the teachings herein, access to both the source and reconstructed frames make it possible to design algorithms that train on the source frames and send information that guides the decoder into achieving superior restoration. The teachings herein describe, among other things, classification of pixels based on spatial and data-adaptive characteristics, followed by encoding and signaling offset corrections, as part of guided loop restoration techniques in video coding. By correcting pixel values using offsets based on context derived from pixel characteristics, various systematic errors (such as DC shifts in flat regions of frames), or color bias, may be removed or at least partially compensated.

Guided loop restoration is described herein first with reference to a system in which the teachings may be incorporated.

Figure 1:
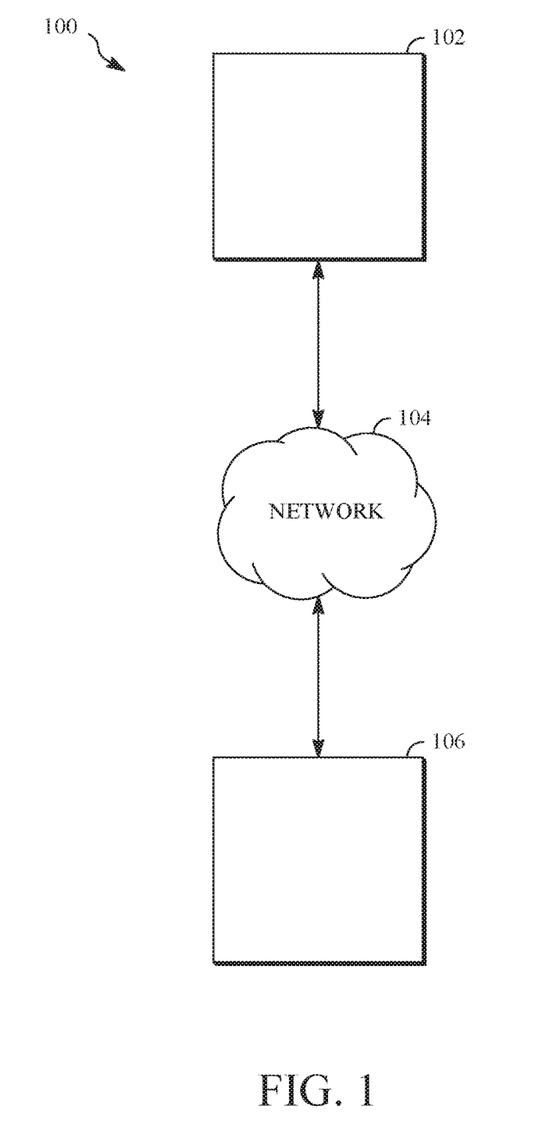
FIG. 1 is a schematic of a video encoding and decoding system.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
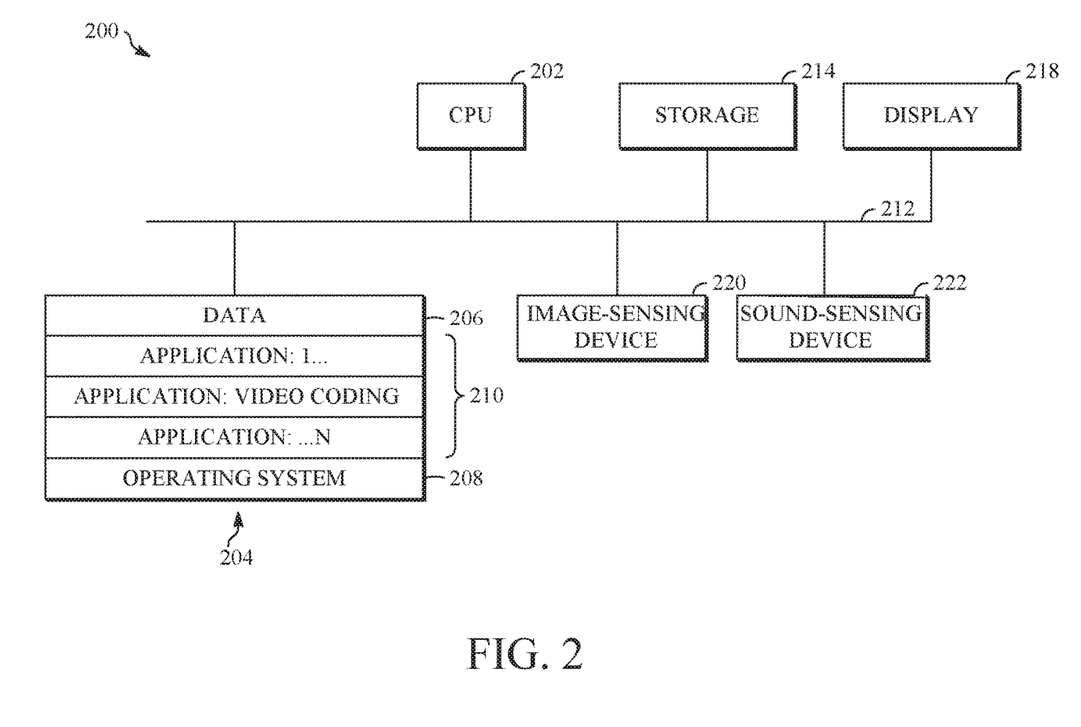
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., an HTTP-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
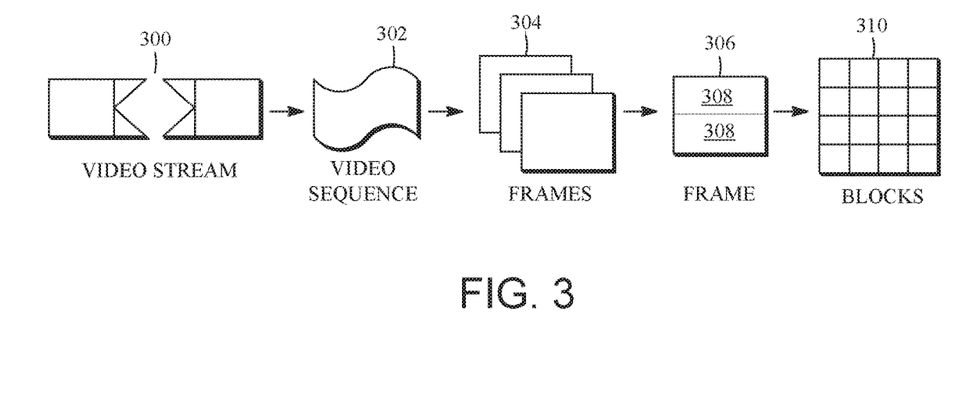
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger. Unless otherwise noted, the terms block and macroblock are used interchangeably herein.

Figure 4:
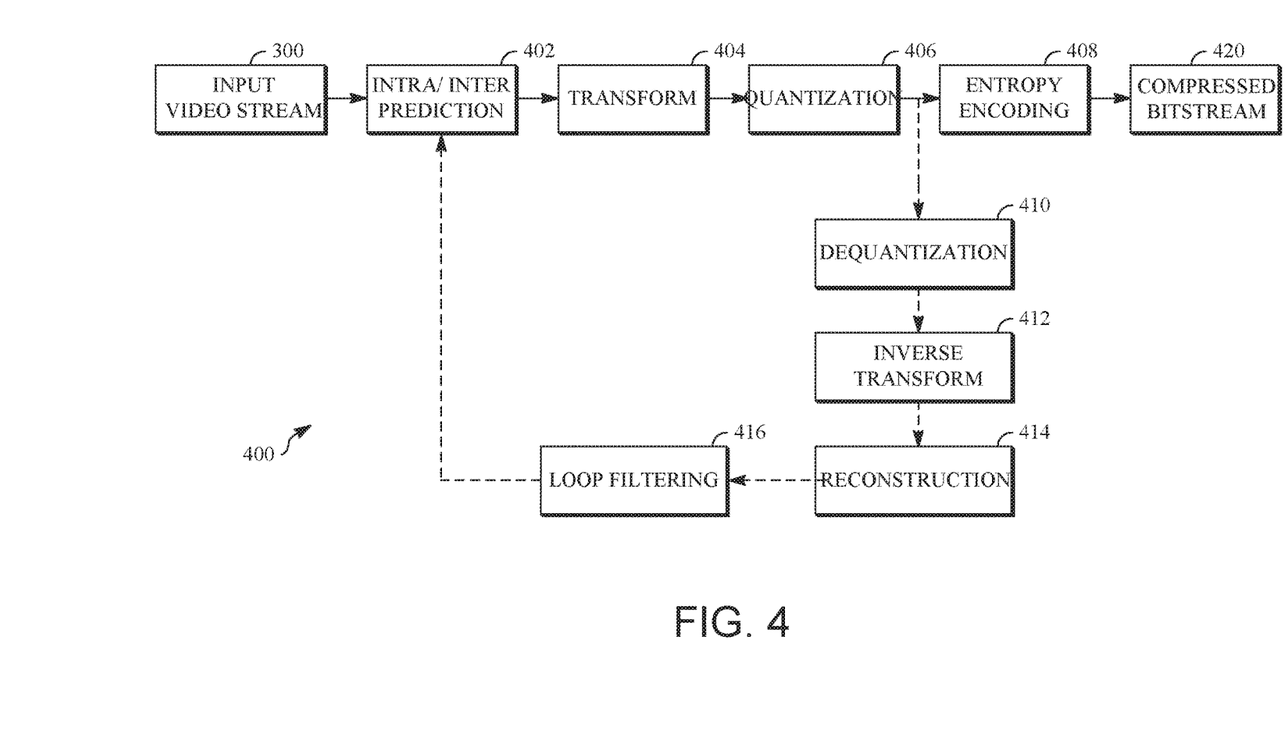
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 6, below. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
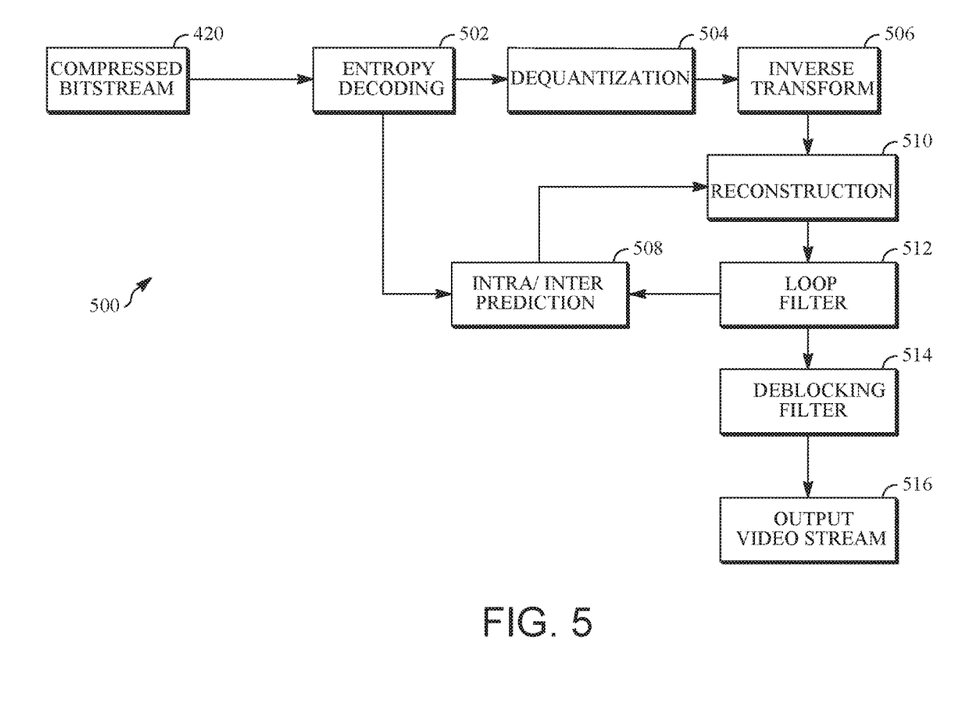
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 10 below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. In some implementations of the decoder 500, the deblocking filtering stage 514 is applied before the loop filtering stage 512. Additionally or alternatively, the encoder 400 includes a deblocking filtering stage in place of or in addition to the loop filtering stage 416.

Figure 6:
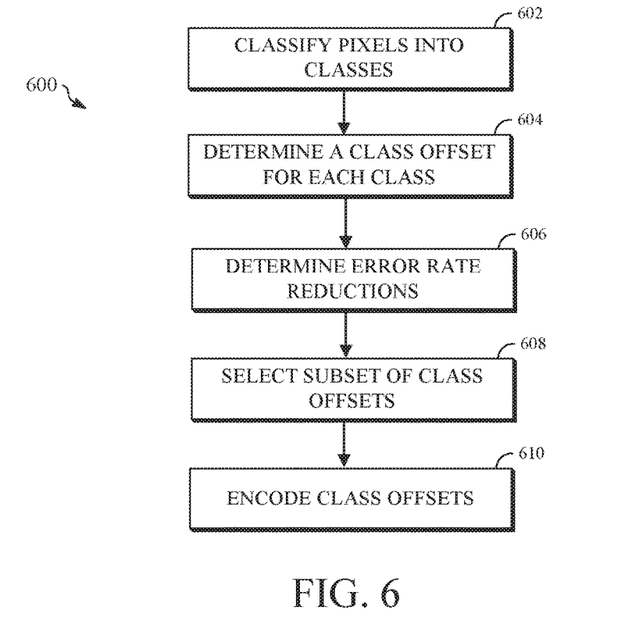
FIG. 6 is a flowchart diagram of a process for reducing error in a reconstructed frame in accordance with a first implementation of this disclosure.

As explained above, guided offset correction can be used to reduce error in a reconstructed frame. FIG. 6 is a flowchart diagram of a method or process 600 for reducing error in a reconstructed frame in accordance with an implementation of this disclosure. The process 600 can be implemented in an encoder such as the encoder 400 and can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 600. In at least some implementations, the process 600 can be performed in whole or in part by the loop filtering stage 416 of the encoder 400.

The process 600 can be implemented using specialized hardware or firmware. Some computing devices can have multiple memories, multiple processors, or both. The steps or operations of the process 600 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

At 602, the pixels of a reconstructed frame are classified into classes. This may also be referred to herein as assigning a pixel to a class. Not all pixels of the frame must be classified into classes. In some implementations, only some pixels of the frame are classified. For example, pixels of a frame may be segmented into groups of pixels, with pixels of only certain of the groups classified into classes. The segmentation may be into blocks, such as described with regard to FIG. 3, or alternatively or additionally into slices, segments, a diagonal tessellation of a frame or block, or any other shape or different shapes. Pixels of the reconstructed frame can be classified into one or more classes. The classification is desirably based on a classification scheme. The classification scheme can include multiple classifications. Where the classification scheme includes multiple classifications, a pixel of the reconstructed frame may be classified into a respective class for each of the multiple classifications. The number of classes available for a classification of the classification scheme may be predefined such as in a configuration file. The number of classes available for a classification can be dynamically determined, either starting from the predefined number or not, at pixel classification time. Dynamically determining the number of classes available for a classification may be based on the results of the classification scheme.

In an example herein, the classification scheme includes one or more of an amplitude-based classification, a local-variation-based classification, an edge-based classification, or a spatial classification.

The amplitude-based classification, for example, assigns a pixel to an intensity class based on the pixel value. The amplitude-based classification can classify a pixel into a number of bins where the bins correspond to the classes of the amplitude-based classification. In an implementation, the amplitude range of the pixels of the frame is divided to obtain a desired number of classes, such as through the use of 8, 16, 32, or 64 bins. For example, where the amplitude range is 0-255, and 64 classes are sought, each of the 64 bins can be designed for 4 pixel values. Bin 1 may be used for classifying pixels having values in the range 0-3, bin 2 may be used for classifying pixels having values in the range 4-7, bin 3 may be used for classifying pixels having values in the range 8-11, and so on, in this example. Similar logic may apply to other numbers of classes.

The local-variation-based classification assigns a local-variation class to a pixel based on its value relative to the values of one or more spatially-neighboring pixels. For example, a local-variation class may be determined based on an absolute difference between a value of the pixel and an average of values of the eight spatially-neighboring pixels of the pixel. Fewer or more pixels may be used. Other combinations of pixel values may be used. For example, the local-variation class may be based on an average of the absolute differences between a value of the pixel and respective values of spatially-neighboring pixels of the pixels. The pixel may be assigned to one of number of available classes, where the classes are defined as ranges of output values. For example, the pixel may be assigned to a class based on the absolute difference falling within a range of absolute values for the class. In another example, the pixel may be assigned to a class based on the average falling within a range of average values for the class. The number of classes for the local-variation-based classification may be pre-defined. Alternatively or additionally, the number of classes for the local-variation-based classification can be determined after all, or some, of the output values are determined. For example, the number of pixels within a class may be limited to a maximum number of pixels. When the number of pixels within a class reaches the maximum number of pixels, the class may be split. The class may initially be a pre-defined class that is then split. Alternatively, the class may be initially defined by the range of output values until the maximum number of pixels is reached, and the class is then split. The class may be split in any number of ways. One example is by splitting the class in half.

The edge-based classification assigns an edge class to a pixel. The edge class may indicate how close the pixel is to an edge. The edge classes may be defined by ranges of gradient magnitudes. A gradient magnitude may be calculated in the x-direction and the y-direction for the pixel. For example, a Sobel operator may perform a two-dimensional spatial gradient measurement to generate an approximate absolute gradient magnitude. Other measurements of high spatial frequency for a pixel, e.g., that correspond to edges, may be made so as to assign the pixel to an edge class. More than one technique may be combined to generate one or more output values for the assignment to an edge class.

The spatial classification assigns a tile class to a pixel. A frame may be divided into tiles sharing a common width and a common height. The width and the height may be the same, or the width and the height may be different. The tiles may correspond, in whole or in part, to blocks. Tiles at the bottom edge, the right edges, or both, can have smaller or bigger sizes than the rest of the tiles. The number of classes of the spatial classification can be equal to or less than the number of tiles of the frame. A pixel may be assigned a tile class based on in which tile the pixel is located.

Figure 9:
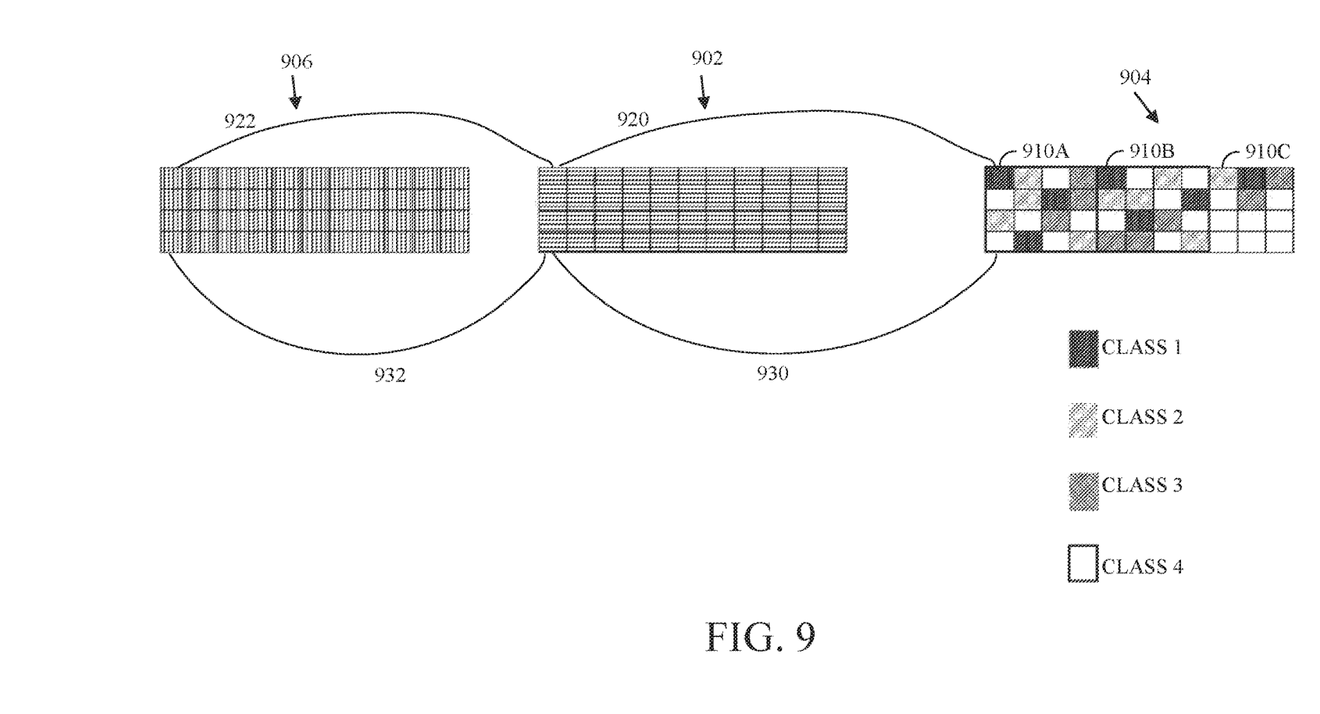
FIG. 9 is a diagram of video frames used to illustrate the process of FIG. 6.

FIG. 9 depicts a source frame 902, a reconstructed frame 904 output from, e.g., the reconstruction stage 414, and an offset-adjusted frame 906 used in the description below. By way of example, and without limitation, FIG. 9 depicts the partitioning of the reconstructed frame 904 into three tiles 910A-910C. Partitioning may be partitioned using any number of techniques. Each of tiles 910A, 910B has dimensions of 4 pixels×4 pixels. However, tile 910C is at the right edge of the frame, and is smaller than tiles 910A, 910B. Pixels within the tile 910A may be assigned to a first tile class, pixels within the tile 910B may be assigned to a second tile class, and pixels within the tile 910C may be assigned to a third tile class.

Referring back to FIG. 6, classifying pixels into classes may further assign each pixel of the reconstructed frame 904 to a single class of the classification scheme based on the individual classifications. The total number of classes for the classification scheme can be derived from the classes of the individual classifications. By way of example, and without limitation, assuming that the amplitude-based classification results in or is configured with 16 classes, the local-variation-based classification results in or is configured with 10 classes, the edge-based classification results in or is configured with 20, and the spatial classification results in or is configured with 4 classes, the total number of classes for the classification scheme can be 12,800 (i.e., 16×10×20×4) classes, where each of these classes comprises a combination of an intensity class, a local-variation class, an edge class, and a tile class. Each pixel of the frame can be assigned into one of the 12,800 classes using its intensity class, local-variation class, edge class, and tile class. The intensity class, the local-variation class, the edge class, and the tile class of the pixel may be compared to those of each class until a class sharing all four classes with the pixel is found. The pixel is then assigned to that class.

Again using FIG. 9 as a non-limiting example, the pixels of the reconstructed frame 904 are assigned to classes 1-4 as depicted by the shading.

Other configurations of the classes of the classification scheme may be used. For example, at least some of the pixel classes are associated with one or more known or determined values, and the pixels are assigned to those pixel classes based on values known or determined for those pixels. In this case, or where every pixel class has such values, the values for the pixel classes may be combined, e.g., by multiplication or otherwise, to generate a value or range of values. The values for a pixel used to assign the pixel to the pixel classes may be similarly or differently combined to determine the single class of the classification scheme.

Other classification schemes that include other classifications may be used. As mentioned previously, other numbers of classes are possible. Assigning the pixel using some, and not all, of the classes may be used.

Figure 7:
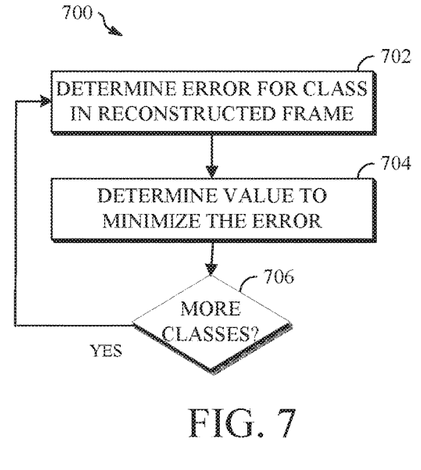
FIG. 7 is a flowchart diagram of a process for determining class offsets in accordance with implementations of this disclosure.

At 604, a class offset is determined for the classes of the classification scheme. A class offset can be a value to be added to each pixel of a class. The determination of the class offset at 604 can be implemented as shown by FIG. 7. FIG. 7 is a flowchart diagram of a process 700 for determining class offsets in an implementation of this disclosure.

At 702, a class error for the class is determined. The class error may be determined by a comparison between pixels of the source frame in the class and pixels of the reconstructed frame. The comparison may be performed between the values of pixels of the reconstructed frame that are in the class and co-located pixels within the source frame. For example, lines 920 and 930 are directed to co-located pixels within each of the source frame 902 and the reconstructed frame 904 of FIG. 9. The class error can be calculated using differences between values of reconstructed pixels in the reconstructed frame of the class and values of corresponding (i.e., co-located) pixels in the source frame. The differences are combined, such as by adding them together, to obtain the class error. The class error can be a positive or negative number, i.e., a signed value.

At 704, a value is determined to minimize the class error. In an implementation, minimizing the error minimizes a square error for the class between the source frame and the reconstructed frame. One technique to determine the value that requires little computation is to calculate the average error per pixel. The average error per pixel can be calculated by dividing the class error by the number of pixels in the class. The value determined at 704 for a class is the class offset for the class at 604.

If there are more classes for which a class offset has not been determined at 706, the process 700 returns to 702 for consideration of the next class. Otherwise, the process 700 terminates.

Figure 8:
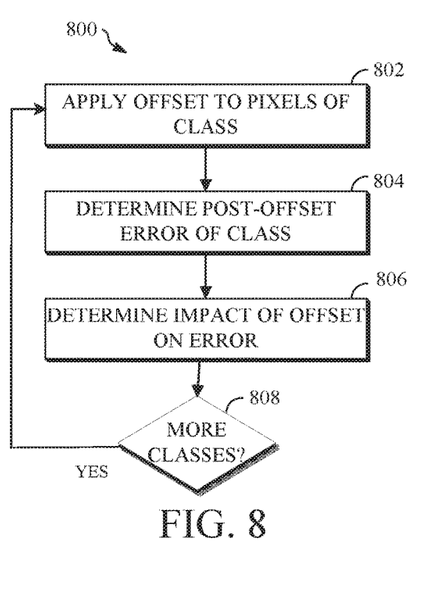
FIG. 8 is a flowchart diagram of a process for determining error rate reductions in accordance with implementations of this disclosure.

Referring again to FIG. 6, the process 600 determines the error rate reduction for a class resulting from applying the class offset to the pixels of the class at 606. This determination may be made for each class that includes pixels. In an implementation, determining the error rate reduction at 606 is implemented as shown in FIG. 8. FIG. 8 is a flowchart diagram of a process 800 for determining error rate reductions.

At 802, the class offset for a class is applied to pixels of the class resulting in offset-adjusted pixels. The offset-adjusted pixels result in an offset-adjusted frame, such as the offset-adjusted frame 906 of FIG. 9.

At 804, a post-offset error for a class is determined. This is also called a post-offset class error herein. The post-offset class error may be calculated using pixels of the source frame and corresponding (i.e., co-located) pixels of the class in the offset-adjusted frame. For example, the post-offset class error may be calculated using pixel values of the source frame 902 and the corresponding pixel values of the offset-adjusted frame 906 that belong to the class. For example, lines 922 and 932 depict such corresponding pixels. The post-offset class error can be calculated using the differences between pixel values of pixels in the class after the offset is applied as compared to the original values of the pixels before prediction. The post-offset class error can be a mean square error between pixel values. The post-offset class error can be a sum of absolute differences error between pixels values. Any other suitable error measure can be used.

At 806, the process 800 determines the impact of applying a class offset of a class to the pixels of the reconstructed frame 904. The impact of applying a class offset can mean the amount of error reduction due to applying the class offsets as compared to the error before applying the class offsets. The impact can be comparison of a reconstructed error and the post-offset error for the class. The reconstructed error for a class is an error for the pixels of the class calculated based on the pixel values of the pixels of the class in the source frame and the pixel values of the pixels of the class in the reconstructed frame. Desirably, the reconstructed error is calculated using the same technique as the determination of the post-offset error of the class at 804, regardless of what technique is used. In some cases, determining the impact of the offset of the error for a class of pixels at 806 includes calculating a difference between the reconstructed error and the post-offset error for the class. In one example, the difference is the result of subtracting the post-offset error from the reconstructed error. The impact may be stored as an error rate reduction for the class as a result of the offset.

Although FIG. 8 shows the determination of the post-offset error for the class and the determination of the impact of the offsets on the error as separate operations, this is not necessary. These operations can be combined or performed concurrently or performed iteratively in order to provide a value for the error rate reduction to the process 600. In an alternative example, the error in individual pixels in the class may be calculated by a comparison of the value of the pixel in the source frame as compared to its value in each of the reconstructed frame and the post-offset frame. The difference between the two errors for pixels of the class could be accumulated and then divided by the number of pixels to determine the error rate reduction for the class. Other techniques of determining impact (in this example, the error rate reduction) on a class resulting from the use of the class offset may be used.

If there are more classes for which an impact has not been determined at 808, the process 800 returns to 802 for consideration of the next class. Otherwise, the process 800 terminates.

Returning again to FIG. 6, a subset of the class offsets is selected at 608. In an implementation, the subset of the class offsets includes those class offsets that result in the largest error rate reductions for their associated classes. To determine the largest error rate reductions, the error rate reductions can be sorted relative to each other, in absolute terms, any combination thereof, or in other ways. The number of class offsets forming the subset can be based on a defined number. The defined number may be 8, 16, 32, or 64, for example. The defined number can be based on a number of bits available for encoding class offsets. In an implementation, and by way of example only, in a case where six bits for non-zero offsets are available for encoding, the subset of class offsets selected is such that the range of the selected class offset values can be encoded with the six bits (i.e., a range of values $[-32, 31]$). The classes included in the subset of classes may be those classes having error rate reductions above a certain minimum value, instead of or in addition to be limited to the defined number. The class offsets that are not selected as part of the subset can be set to zero as part of the process 600 at 608. This may be referred to herein as thresholding the class offsets.

At 610, the class offsets are encoded into a bitstream. The bitstream can be compressed bitstream 488, for example. The class offsets may be encoded in association with an identifier for the class, such as a class number, or may be encoded as a sequence of values from a first class to a final class. Where the class offset has a value of zero, it may be omitted. In an implementation where some of the class offsets are set to zero, run-length Golomb-Rice coding may be used wherein each run of zero values is encoded using Golomb-Rice codes with one of pre-specified parameters (M=2, 4, 8, or 16) indicated in the bitstream. Non-zero class offsets can be binary coded. The encoded sequence of class offsets may be arithmetic coded before inclusion in the bitstream.

Although not expressly shown, the parameters for each of the classes may be encoded in the bitstream at 610. In an implementation, the parameters encoded are those parameters a decoder will need to reconstruct the classes used by the encoder. The parameters may be included in a look-up table for signaling to the decoder in the bitstream, whereby the look-up table can be reproduced. The parameters may include the number of bins used for the amplitude-based classification. The parameters may include ranges of values used for the local-variation-based classification. The parameters may include ranges of values for each edge class in the edge-classification. The parameters may include dimension of the tiles for the spatial classification. Indicating the number of offsets to retain after thresholding the class offsets may be avoided where all of the class offsets are included in the bitstream, e.g., where the zero values are encoded.

Figure 10:
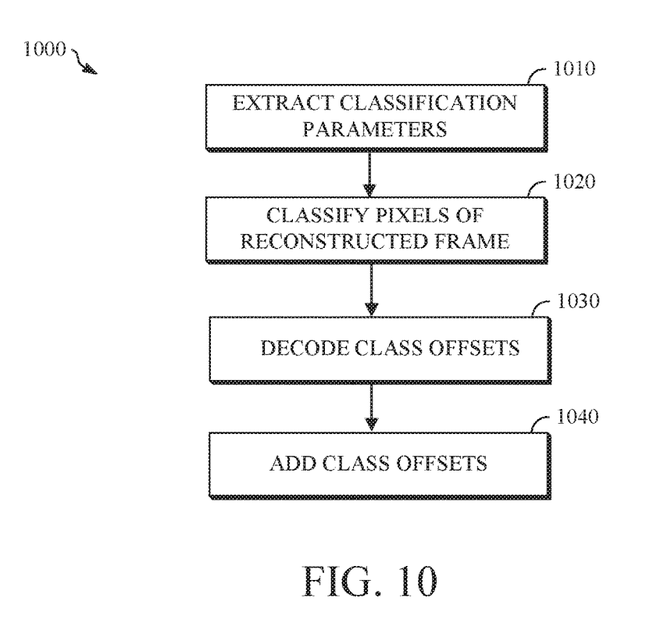
FIG. 10 is a flowchart diagram of a process for reducing error in a reconstructed frame in accordance with a second implementation of this disclosure.

FIG. 10 is a flowchart diagram of a process 1000 for reducing error in a reconstructed frame. The process 1000 may be performed by a decoder, such as the decoder 500. For example, the process 1000 can be performed in whole or in part by loop filter stage 512 of the decoder 500. Implementations of the process 1000 can be performed by storing instructions in a memory such as the memory 204 of the receiving station 106 to be executed by a processor such as CPU 202, for example.

The process 1000 can be implemented using specialized hardware or firmware. Some computing devices can have multiple memories, multiple processors, or both. The steps or operations of the process 1000 can be distributed using different processors, memories, or both. For simplicity of explanation, the process 1000 is depicted and described as a series of steps or operations. However, the teachings in accordance with this disclosure can occur in various orders and/or concurrently. Additionally, steps in accordance with this disclosure may occur with other steps not presented and described herein. Furthermore, not all illustrated steps or operations may be used to implement a method in accordance with the disclosed subject matter.

At 1010, classification parameters are extracted from a received encoded bitstream. In an implementation, an encoder, such as the encoder 400, and a decoder, such as the decoder 500, can have a same classifier system. A classifier system can be a module, or a set of instructions, that classifies the pixels of a reconstructed frame, such as shown with regard to the reconstructed frame 904, based on a classification scheme as described with respect to the process 600. The classification parameters can be classification parameters encoded by an encoder, such as an encoder executing the process 600 at 610. The classification parameters are used to generate classes for assignment of pixels.

At 1020, the pixels of a reconstructed frame, such as a frame resulting from reconstruction stage 510, are classified into the classes using characteristics of the pixels. For example, the classification may be performed similarly to that described with regard to the process 600 at 602.

At 1030, the class offsets are decoded from the encoded bitstream. In an example, the offset sequence containing both non-zero and zero values for the class offsets is decoded. How the class offsets are decoded depends upon how they were encoded into the bistream. Decoding the class offsets may include entropy decoding using arithmetic decoding followed by binary decoding the non-zero class offsets and decoding the zero value class offsets using run-length Golomb-Rice coding.

At 1040, the class offsets are added to the reconstructed frame. The operations at 1040 may be performed on the reconstructed frame either before or after applying a deblocking filter when a deblocking filter is used. Adding class offset to the reconstructed frame may include adding a non-zero class offset of a class to pixel values of pixels classified within the class. This may be done for each non-zero class offset or for all class offsets.

For simplicity of explanation, the processes 600, 700, 800, and 1000 are depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method of reducing error in a reconstructed frame comprising pixels, the method comprising:
    classifying the pixels into available offset classes based on a classification scheme, wherein the classification scheme includes multiple classifications associated with respective pixel characteristics, and for a classification of the multiple classifications:
        the classification has a respective plurality of classification classes; and
        each of the plurality of classification classes of the classification is defined by respective ranges of values of a pixel characteristic associated with the classification, wherein the available offset classes into which the pixels may be classified are determined as respective combinations of classification classes of the multiple classifications, and
    wherein classifying the pixels comprises:
        assigning a pixel of the pixels to a respective classification class of at least two classifications of the multiple classifications based on values of the pixel and the respective ranges of values defining the plurality of classification classes of each of the at least two classifications; and
        assigning the pixel to a single offset class of the available offset classes based on a combination of the classification classes of the at least two classifications to which the pixel is assigned;
    for each offset class of those of the available offset classes that include pixels after the classifying:
        determining an offset value for the offset class;
        applying the offset value for the offset class to each pixel of the offset class resulting in offset-adjusted pixels of the offset class; and
        determining, for the offset class, an error reduction in using the offset value for the offset class as compared to omitting the offset value for the offset class, the error reduction based on the pixels of the offset class in the reconstructed frame, the offset-adjusted pixels of the offset class, and co-located source pixels in a source frame decoded to generate the reconstructed frame; and
    selecting, for reducing error in the reconstructed frame, a subset of those of the available offset classes that include pixels after the classifying based on the error reductions.

2. The method of claim 1, wherein selecting the subset comprises:
    selecting from those of the available offset classes that include pixels after the classifying, a defined number of offset classes having highest values for the error reductions.

3. The method of claim 1, further comprising:
    encoding, into a bitstream, parameters related to the classification scheme and the offset values of the available offset classes of the subset.

4. The method of claim 1, further comprising:
    setting the offset values corresponding to those of the available offset classes that are not in the subset to zero; and
    encoding, into a bitstream, the offset values for the available offset classes of the subset.

5. The method of claim 4, wherein encoding the offset values comprises encoding the offset values of zero using a run-length Golomb-Rice coding.

6. The method of claim 5, wherein non-zero offset values are binary coded.

7. The method of claim 1, wherein classifying the pixels comprises:
    partitioning the reconstructed frame into tiles;
    assigning a pixel of the reconstructed frame to a tile class of a first classification of the multiple classifications based on a spatial location of the pixel relative to the tiles, the spatial location of the pixel being a first characteristic of the pixel;
    assigning the pixel of the reconstructed frame to a second classification class of a second classification of the multiple classifications based on a second characteristic of the pixel; and
    assigning the pixel of the reconstructed frame into the single offset class based on a combination of the tile class and the second classification class.

8. The method of claim 1, wherein classifying the pixels comprises:
    assigning a pixel of the reconstructed frame to an intensity class of a first classification of the multiple classifications based on a pixel value of the pixel and a number of intensity bins of the first classification, the intensity class being a first classification class, and the pixel value being a first characteristic of the pixel;

assigning the pixel of the reconstructed frame to a second classification class of a second classification of the multiple classifications based on a second characteristic of the pixel; and assigning the pixel of the reconstructed frame to the single offset class based on a combination of the intensity class and the second classification class.

9. The method of claim 1, wherein classifying the pixels comprises:

assigning a pixel of the reconstructed frame to a local-variation class of a first classification of the multiple classifications based a pixel value of the pixel and values of neighboring pixels of the pixel within the reconstructed frame;

assigning the pixel of the reconstructed frame to a second classification class of a second classification of the multiple classifications; and assigning the pixel of the reconstructed frame to the single offset class based on a combination of the local-variation class and the second classification class.

10. An apparatus for reducing error in a reconstructed frame having pixels, the apparatus comprising:

a memory; and a processor configured to execute instructions stored in the memory to:

classify the pixels into available offset classes based on a classification scheme, wherein the classification scheme includes multiple classifications associated with respective pixel characteristics, and for a classification of the multiple classifications:

the classification has a respective plurality of classification classes; and each of the plurality of classification classes of the classification is defined by respective ranges of values of a pixel characteristic associated with the classification, wherein the available offset classes into which the pixels may be classified are determined as respective combinations of classification classes of the multiple classifications, and wherein the instruction to classify the pixels comprises instructions to:

assign a pixel of the pixels to a respective classification class of at least two classifications of the multiple classifications based on values of the pixel and the respective ranges of values defining the plurality of classification classes of each of the at least two classifications; and assign the pixel to a single offset class of the available offset classes based on a combination of the classification classes of the at least two classifications to which the pixel is assigned;

for each offset class of those of the available offset classes that include pixels after classifying the pixels:

determine an offset value for the offset class;

apply the offset value for the offset class to each pixel of the offset class resulting in offset-adjusted pixels of the offset class;

determine, for the offset class, an error reduction in using the offset value for the offset class as compared to omitting the offset value for the offset class, the error reduction based on the pixels of the offset class in the reconstructed frame, the offset-adjusted pixels of the offset class, and co-located source pixels in a source frame decoded to generate the reconstructed frame; and select, for reducing error in the reconstructed frame, a subset of those of the available offset classes that include pixels after classifying the pixels, the subset having highest values for the error reductions.

11. The apparatus of claim 10, wherein the instructions further comprise instructions to:

calculate, for each offset class of those of the available offset classes that include pixels after classifying the pixels, an error for the offset class based on values of the pixels of the offset class in the reconstructed frame and values of co-located pixels in the source frame used to generate the reconstructed frame, the offset value for the offset class designed to reduce the error.

12. The apparatus of claim 11, wherein the offset value for the offset class comprises an average per pixel error value generated using the error, and the offset value is a signed value.

13. The apparatus of claim 10, wherein the instructions to classify the pixels comprise instructions to:

partition the reconstructed frame into tiles;

assign a pixel of the reconstructed frame to a tile class of a first classification of the multiple classifications based on a spatial location of the pixel relative to the tiles, the spatial location of the pixel being a first characteristic of the pixel;

assign the pixel to an intensity class of a second classification of the multiple classifications based on a pixel value of the pixel, the pixel value being a second characteristic of the pixel;

assign the pixel to a local-variation class of a third classification of the multiple classifications based the pixel value of the pixel relative to values of neighboring pixels of the pixel within the reconstructed frame, the pixel value of the pixel relative to values of neighboring pixels being a third characteristic of the pixel;

classify the pixel to an edge class of a fourth classification of the multiple classifications based on a proximity of the pixel to an edge in an image of the reconstructed frame, the proximity to the edge being a fourth characteristic of the pixel; and determine the single offset class for the pixel based on a combination of the intensity class of the pixel, the local-variation class of the pixel, the edge class of the pixel, and the tile class of the pixel.

14. The apparatus of claim 13, wherein a quantity of the available offset classes is based on a quantity of available tile classes, a quantity of available edge classes, a quantity of available intensity classes, and a quantity of local-variation classes.

15. The apparatus of claim 10, wherein the instructions to determine the error reduction include instructions to:

calculate a first mean-squared error between the offset-adjusted pixels of the offset class and co-located source pixels in the source frame;

calculate a second mean-squared error between the pixels of the offset class in the reconstructed frame and co-located source pixels in the source frame;

subtract the first mean-squared error from the second mean-squared error to generate a difference; and calculate the error reduction for the offset class by dividing the difference by a number of pixels in the offset class.

16. The apparatus of claim 10, wherein a number of available offset classes in the subset is based on at least one of:

a number of bits available for encoding class offsets; or a number of offset classes having an error reduction above a minimum value.

17. The apparatus of claim 10, wherein the instructions comprise instructions to:
    encode, into a bitstream, parameters related to the classification scheme and respective offset values of offset classes of the subset.

18. A method of reducing error in a reconstructed frame comprising pixels, the method comprising:
    decoding classification parameters of a classification scheme and offset values for the reconstructed frame, from an encoded bitstream, the classification parameters and the offset values encoded by:
        classifying pixels of a reconstructed frame generated by an encoder decoding a source frame into available offset classes based on the classification scheme, wherein the classification scheme includes multiple classifications associated with respective pixel characteristics, and for a classification of the multiple classifications:
            the classification has a respective plurality of classification classes; and
            each of the plurality of classification classes of the classification is defined by respective ranges of values of a pixel characteristic associated with the classification, wherein the available offset classes into which the pixels may be classified are determined as respective combinations of classification classes of the multiple classifications, and
        wherein classifying the pixels comprises:
            assigning a pixel of the pixels to a respective classification class of at least two classifications of the multiple classifications based on values of the pixel and the respective ranges of values defining the plurality of classification classes of each of the at least two classifications; and
            assigning the pixel to a single offset class of the available offset classes based on a combination of the classification classes of the at least two classifications to which the pixel is assigned;
        for each offset class of those of the available offset classes that include pixels after the classifying:
            determining an offset value for the offset class;
            applying the offset value for the offset class to each pixel of the offset class resulting in offset-adjusted pixels of the offset class; and
            determining, for the offset class, an error reduction in using the offset value for the offset class as compared to omitting the offset value for the offset class, the error reduction based on the pixels of the offset class in the reconstructed frame generated by the encoder, the offset-adjusted pixels of the offset class, and co-located source pixels in the source frame;
        selecting, for encoding the source frame, a subset of those of the available offset classes that include pixels after the classifying based on the error reductions; and
        encoding, in associated with the source frame, the classification parameters and the offset values, the offset values including at least the offset values for the offset classes of the subset;
    classifying the pixels, based on the classification parameters, into those of the available offset classes selected by the encoder; and
    applying a respective offset value for an offset class to each pixel of the offset class within the reconstructed frame to generate an offset-adjusted frame.

19. The method of claim 18, wherein the offset values comprise non-zero offset values and zero offset values, the method further comprising:
    decoding the non-zero offset values using binary coding; and
    decoding the zero offset values using run-length Golomb-Rice coding.

* * * * *